United States Patent Office 3,689,388
Patented Sept. 5, 1972

3,689,388
ELECTROLYTIC POLISHING OF
NIOBIUM PARTS
Heinrich Diepers and Otto Schmidt, Erlangen, Germany, assignors to Siemens Aktiengesellschaft, Berlin and Munich, Germany
Filed June 2, 1971, Ser. No. 149,248
Claims priority, application Germany, June 3, 1970,
P 20 27 156.1
Int. Cl. C23b 3/06; B01k 3/00
U.S. Cl. 204—140.5         9 Claims

ABSTRACT OF THE DISCLOSURE

A method of electrolytically polishing parts made of niobium, which comprises immersing the niobium parts as an anode in an electrolyte substantially composed by weight of 86 to 93% $H_2SO_4$, 1.5 to 4.0% HF and 5.5 to 10.0% $H_2O$, maintaining the electrolyte during the polishing action at a substantially constant temperature between about 15° and 50° C., applying between the niobium part and an immersed cathode a substantially constant unidirectional voltage of about 9 to 15 volts whereby electrolyte current oscillations occur whose amplitude decays due to progressing oxidation of the niobium surface. Upon sufficient decay of the oscillations, the voltage is disconnected until the oxide is substantially dissolved. Preferably the same cycle is many times repeated.

---

Figure 1:
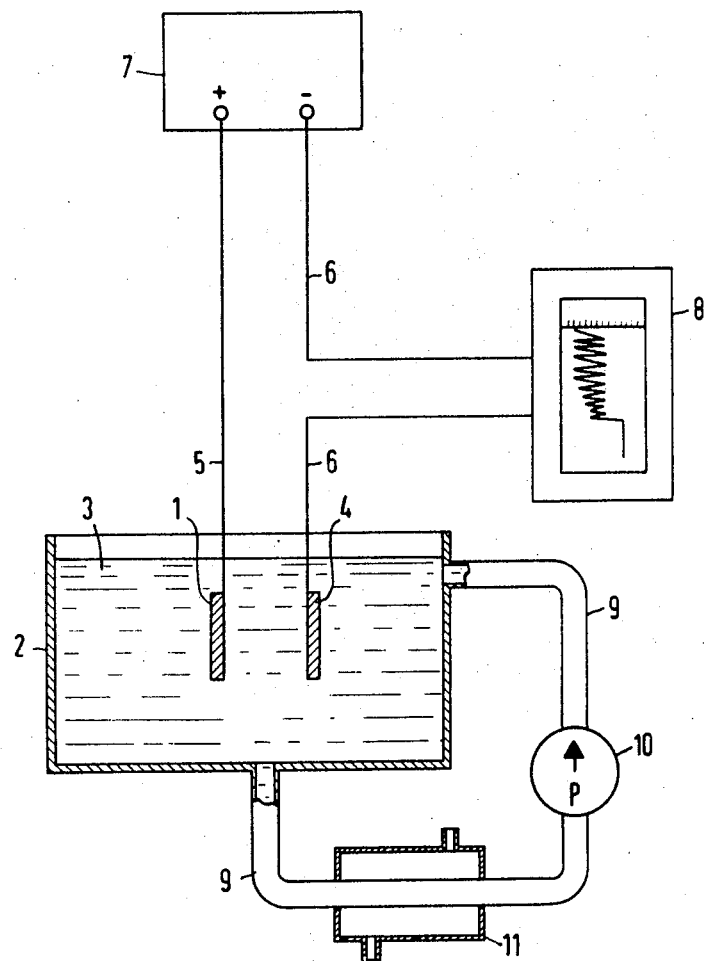

Our invention relates to a method of electrolytically polishing niobium parts by immersing the niobium parts as an anode into an electrolyte containing $H_2SO_4$, HF and $H_2O$ and applying an electrical voltage between the niobium part and a cathode also immersed in the electrolyte.

Various known electrolytes for polishing of niobium consist of concentrated sulphuric acid and hydrofluoric acid and thus contain $H_2SO_4$, HF and $H_2O$ (Gmelin's Handbuch der anorganischen Chemie, 8th edition, vol. "Niobius," Part A, Weinheim/Bergstrasse, 1969, pp. 286/287). The individual polishing prescriptions differ by at least one essential parameter, such as the electrolyte concentration, bath temperature, voltage and current density between anode and cathode. The sulphuric acid serves as an oxidation agent for the niobium and the hydrofluoric acid acts to chemically dissolve the oxide layer. Current and voltage are preferably on the so-called current plateau which is a voltage range wherein the current is almost independent of the voltage, i.e., substantially constant.

The production of very smooth, brilliant surfaces by means of the known polishing methods entails certain difficulties, especially when a high quality surface is required. This applies, for example, to superconducting cavity resonators of niobium as used particularly for particle accelerators. During operation of such cavity resonators a high frequency absorption takes place in the superconducting surface layers of the resonators. To keep this high-frequency absorption, as well as the losses, at a minimum, the surface layer should have the most uniform composition possible, should be as smooth as possible and be free from defects of any kind. The surface roughness unavoidably created during the machining of the niobium surfaces, must therefore be removed by polishing. It is also necessary, as a rule, to remove a surface layer several 100 μm. in thickness from the niobium part if the latter has defects in the crystal lattice stemming from previous machining.

The known methods of electrolytically polishing niobium have been found to be hardly suitable for the production of mirror-smooth surfaces and particularly for the removal of entire surface layers. Problems arise primarily from the difficulties of preserving the once adjusted parameters, especially the concentration of the electrolyte components which may change during the polishing process. As a result, the surface roughnesses of the niobium part to be polished are not adequately smoothened. Moreover, the polished surfaces may become slightly etched during the course of the polishing cycle so that new surface defects may occur or only relatively thin layers are removed during a simultaneous polishing action upon other surfaces.

It is an object of the invention to provide a method for the electrolytic polishing of niobium parts which reliably affords the production of very smooth niobium surfaces and avoids the above-mentioned difficulties.

Another object is to provide a process for the polishing of niobium which can be easily monitored.

Still another object is to provide a process for electrolytic polishing whereby mirror-smooth surfaces are produced.

For a fuller understanding of the nature and objects of the invention, reference should be made to the following detailed description, and the accompanying drawing.

In brief, the method according to the invention comprises the steps of immersing the niobium part to be polished into an electrolyte consisting essentially of 86 to 93 weight percent $H_2SO_4$, 1.5 to 4.0 weight percent HF and 5.5 to 10.0 weight percent $H_2O$, at a temperature between 15° and 50° C.; applying between the niobium part and the cathode a constant electrical voltage of 9 to 15 volts so that attenuated current oscillations which are superimposed to the electrolyte current will occur. Thereafter, and not later than a complete decay of the current oscillations, the voltage is disconnected until the oxide layer which was built up during the current oscillations is dissolved. Subsequently, a constant voltage between 9 and 15 v. again is applied so that attenuated current oscillations occur. The sequence of switched-on and switched-off voltage is repeated several times.

The invention is based on the dual discovery that current oscillations are simultaneously generated or superimposed when a DC current within the range of 9 and 15 v. at constant voltages is applied to electrolytes of the indicated compositional range at the indicated temperatures, and that these oscillations decay after a certain time. During these auto-generated current oscillations, an excellent polishing effect occurs on the niobium surface. At the same time, an oxide layer is built up which leads to a decay of the oscillations. Deviations of about ±0.1 v. from the adjusted, constant voltage are permissible. When the deviations increase, no more oscillations of adequate amplitude will occur. A switch-off in the voltage brings about the dissolution of the oxide layer so that during a renewed connection of the voltage, current oscillations are again possible. The voltage must be disconnected at the latest following a complete decay of the oscillations, as otherwise the niobium surfaces to be polished will become slightly etched, resulting in new surface roughness. The multiple repetition of periods with switched-on and switched-off voltage produce mirror-smooth surfaces within a short time. The frequent repetition of these periods also makes it possible to remove relatively thick layers without damaging the etching of the surface, so that an end product with mirror-smooth surface is obtained.

While no particular voltage for producing current oscillations is preferred since the voltage to be applied depends on the composition and the temperature of the electrolyte, it was found that with an electrolyte of 89.0 to 90.5 weight percent $H_2SO_4$, 2.2 to 3.0 weight percent HF, the remainder being $H_2O$ within the temperature range of 20 to 35° C. and with voltage constant between 11 and 13 v. especially fast current oscillations will occur which afford a particularly good polishing effect.

It is not necessary to wait with disconnecting the voltage until after the current oscillations are completely decayed. For best utilization of the polishing effect caused during the current oscillations, the voltage preferably is disconnected not earlier than when the maximum amplitude of the current oscillations has been exceeded. It is even better to delay disconnecting the voltage until the amplitude of the current oscillations has decayed to less than approximately 5% of the maximum amplitude.

The earliest timepoint for re-connecting the voltage can be easily determined experimentally. As long as an oxide layer is present, no new current oscillations can occur when the voltage is switched on. To insure a complete dissolution of the oxide layer built up during the current oscillations, the voltage should remain disconnected at least about four minutes while the electrolyte is at rest.

If desired, the dissolution of the oxide layer may be accelerated when the electrolyte is kept agitated or moving, at least at the surface of the niobium part to be polished. In this case the voltage, preferably, should remain disconnected at least about 1.5 minutes.

The method according to the invention has the particular advantage that otherwise hard to observe changes of the parameters of the polishing method may be recognized by the change in the form of the attenuated oscillations, for example by the change in oscillating frequency, the intensity of the attenuation and the level of maximum amplitude during the state when voltage is switched on. Hence, the changes in the parameters may be corrected even during the next procedural step by changing the concentration ratio of the electrolyte components or, better, by increasing the constant voltage within the range of 9 to 15 v. The essential change in the parameters consists, as a rule, in slightly decreasing the HF portion of the electrolyte, since as the hydrofluoric acid is consumed while it dissolves the oxide layer present on the niobium item. The reduction in the HF results in a drop (decrease) of the maximum amplitude of the oscillations, which may be compensated for by a slight voltage increase, during the next switch-on, i.e., reconnection of the constant voltage. For example, the voltage increase needed for compensation amounts to approximately 0.5 to 1 volt when the HF share is reduced by 0.25% by weight.

When the electrolyte volume is large compared to the niobium part to be polished, the changes in the concentration of the electrolyte proportions are so slight when the process is carried out for a short time interval, that corrections are not required. Therefore, the same constant voltage can be applied originally and used as the adjusted voltage in this case, when the voltage is repeatedly switched on. The method becomes considerably more simple, as a result.

Figure 2:
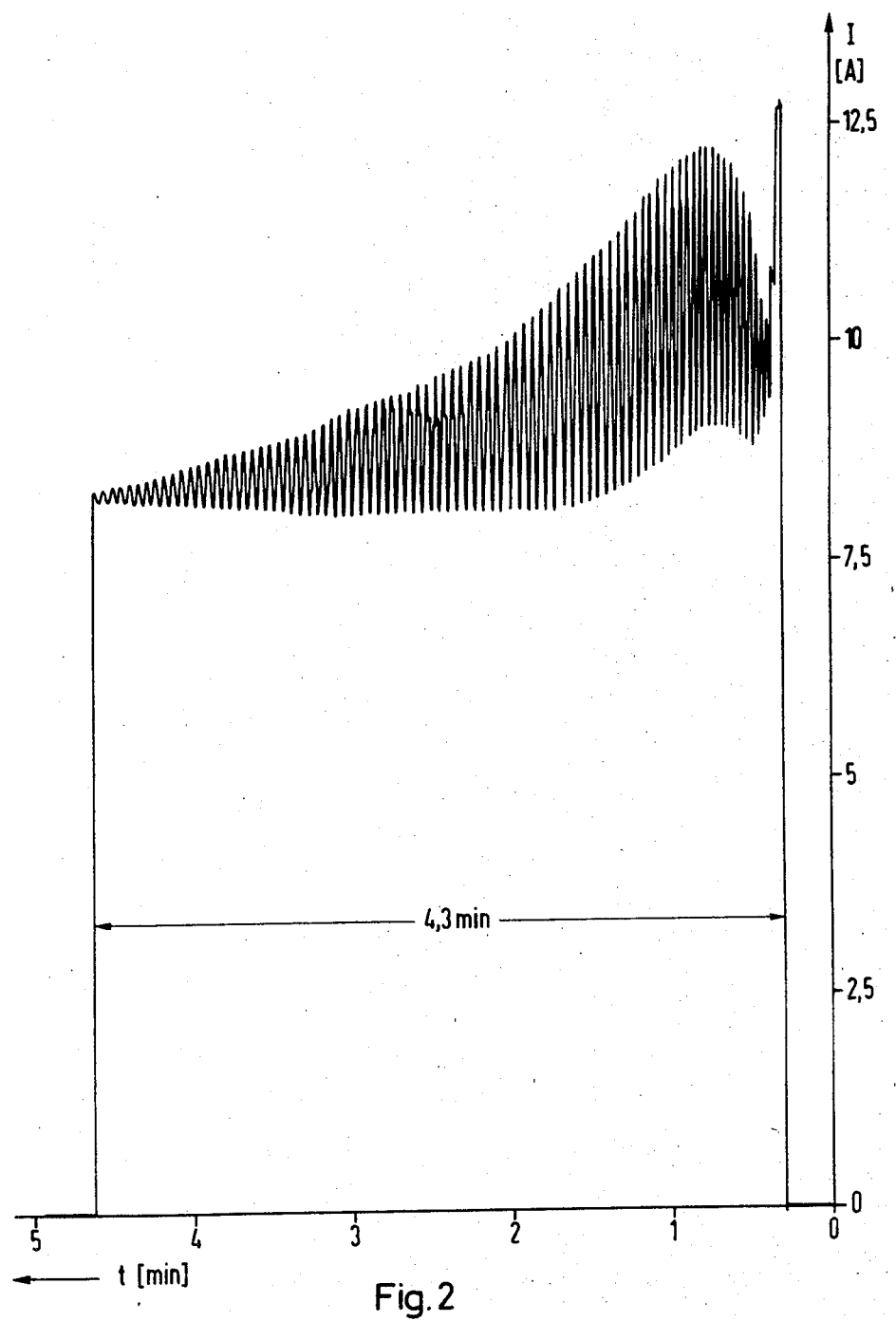

The invention and its advantages will be described in greater detail with reference to the accompanying drawing, in which FIG. 1 is a schematic illustration of a device for performing the method of the invention, FIG. 2 is an explanatory graph exemplifying a time curve of the current oscillations when voltage is applied in accordance with a preferred embodiment of the invention.

In the device shown in FIG. 1, the niobium part 1 to be polished is situated in a pan 2 which contains the electrolyte 3. The pan 2 also contains the cathode 4 which may consist, for example, of platinum or pure aluminum. Niobium, too, may be considered as cathode material but is less desirable since, due to the presence of cathodically-freed hydrogen, a niobium cathode quickly becomes very brittle and must therefore be frequently exchanged. A trace amount of hydrogen becomes dissolved into the niobium part 1 connected as an anode but, if necessary, may be easily removed by degassing-annealing at temperatures between approximately 600 and 1000° C. A suitable material for the pan 2 is aluminum since the latter coats itself with a passivating layer. Leads 5 and 6, which may also be of aluminum, connect the niobium part 1 and the cathode 4 with the outputs of a power-supply unit 7 which affords adjusting a constant direct voltage between the niobium part 1 and the cathode 4. Connected into the lead 6 to the cathode 4 is an apparatus 8 which records the current, for example a conventional graph recorder. The current oscillations and the maintenance of the method parameters are monitored with the aid of the recordings of the recorder. The electrolyte 3 may be agitated and circulated in the pan 2 by passing it through a pump 10, connected into a pipeline 9, so that the electrolyte is kept moving at least at the surface of the niobium part to be polished. The pipeline 9 preferably passes through a heat exchanger 11 where the electrolyte which heats up during the current passage may be cooled, for example with water. The following examples of the method according to the invention were carried out in a device as schematically shown in FIG. 1.

EXAMPLE 1

A niobium cylinder, whose inside had to be polished, had a diameter of 40 mm. and a height of 40 mm. The inner side was precisely turned and mechanically polished. The roughness depth on the inner surface amounted to approximately 0.5 $\mu$m. The cathode was a platinum tube with a diameter of 10 mm., arranged concentrically in the niobium cylinder. The electrolyte was composed of 90 vol.-percent of a 96% sulphuric acid and 10 vol.-percent of 40% hydrofluoric acid. This corresponds to a composition by weight of about 89.8% $H_2SO_4$, 2.6% HF and 7.6% $H_2O$. The bath temperature was about 25° C. The electrolyte volume was 6 liters and was circulated by the pump at a rate of 1 liter per minute. The power supply unit was set to apply a direct voltage of 12.8 v. between the niobium cylinder and the cathode. When this voltage was applied, attenuated current oscillations became superimposed upon the electrolyte current and were recorded on the chart recorder.

A typical time graph of such current oscillations is illustrated in FIG. 2. The ordinate indicates current in amperes, and the abscissa the time in minutes. The abscissa runs from right to left, due to the corresponding movement direction of the paper in the recorder. As will be seen from FIG. 2, the amplitude of the oscillations after the start-up interval, rises quickly to a maximum value and then decreases slowly.

During the oscillations, the voltage was kept constant at 12.8±0.05 v. After about 4.3 minutes the oscillations had decayed and the voltage was disconnected to allow the dissolution of the oxide layer which formed during the oscillations and which very probably consists of $Nb_2O_5$. After 3 minutes a voltage of 12.8 v. was again switched on and again produced current oscillations as shown in FIG. 2. After 4.3 minutes, the voltage was again disconnected for 3 minutes. The cycle of switched-on and switched-off voltage was repeated several times. Following a total of 80 polishing periods, i.e., 80 such cycles of switched on voltage, a 200 $\mu$m. thick layer was removed from the inside of the niobium cylinder which was found to be mirror-smooth, having a remaining roughness depth less than 0.03 $\mu$m. Such a mirror-smooth surface was obtained already after a few polishing cycles. The remaining polishing cycles served only to remove the layer. During this removal the surface quality previously obtained was no longer impaired.

The electrolyte combination used in this example, as well as the bath temperature and the voltage utilized, also yielded particularly good results with other tests.

EXAMPLE 2

One side of a disc of 70 mm. diameter was to be polished. The niobium disc was precisely turned and had a roughness depth of about 5 $\mu$m. The cathode, an aluminum disc of 70 mm. diameter, was placed opposite the side to be polished, at a distance of 40 mm. Both pieces were arranged horizontally in the electrolyte. The electrolyte was composed of 89 vol.-percent of 96% sulphuric acid and 11 vol.-percent of 40% hydrofluoric acid, hence the composition by weight was approximately 89.2% $H_2SO_4$, 2.8% HF and 8% $H_2O$. The bath temperature was 32° C. The electrolyte volume was 6 liters and was circulated at a rate of 1 liter per minute. A direct voltage of 12.2 v. was applied between the niobium disc and the cathode and kept constant ($\pm 0.05$ v.). During the resulting oscillations within a current range of about 3 and 6 amps, the maximum amplitude was obtained somewhat more slowly than with the oscillations illustrated in FIG. 2, and the oscillations decayed somewhat more quickly. The voltage was disconnected after 1.5 minutes before the oscillations had completely decayed. After 3.5 minutes, voltage was again applied, kept constant for 1.5 minutes, and then switched off for 3.5 minutes. This was followed by a series of other cycles of switched-on and switched-off voltage. After a total of 180 polishing cycles, a 220 $\mu$m. thick layer was removed from the niobium part. The polished surface was mirror-smooth and had a roughness depth of less than 0.03 $\mu$m.

In Examples 1 and 2, the electrolytes had a composition within the preferred range of 89.0 to 90.5 weight percent $H_2SO_4$, 2.2 to 3.0 weight percent HF, the rest $H_2O$; and the electrolyte temperatures and the voltages were in the preferred ranges of 20–35° C. and 11 to 13 v. respectively. In the following example, the corresponding parameters were outside of the preferred range, and still yielded satisfactory results.

EXAMPLE 3

The niobium part to be polished was a massive niobium cylinder, 72 mm. in diameter and 45 mm. high, whose one front side had to be polished. This side was lapped down to a roughness depth of about 1.5 $\mu$m. An aluminum disc 70 mm. diameter was used as a cathode and was arranged perpendicularly in the electrolyte pan opposite the front side to be polished, at a distance of 45 mm. The electrolyte consisted of 93 vol.-percent of 96% sulphuric acid and 7 vol.-percent of 40% hydrofluoric acid which corresponds to a composition by weight of about 91.7% $H_2SO_4$, 1.8% HF and 6.5% $H_2O$. The bath temperature was 42° C. The electrolyte volume was 6 liters and was circulating at a rate of 1 liter per minute. A direct voltage of 14.1 v. was applied between the niobium cylinder and the cathode which initiated attenuated current oscillations. These oscillations, in a current range between about 7.5 and 15 amps, were clearly slower than the oscillations in Examples 1 and 2. While in Examples 1 and 2 about 18 to 21 full oscillations occurred per minute, here only about 11 full oscillations per minute were observed. The voltage of 14.1 v. became constant for 1.7 minutes ($\pm 0.05$ v.) and was then disconnected, before the oscillations became completely decayed. Other cycles of switched-off and switched-on voltage followed. After 110 polishing cycles, it was found that a layer of 130 $\mu$m. thickness had been removed from the front side of the niobium cylinder. The surface of the front side was mirror-smooth and had a roughness depth of less than 0.03 $\mu$m.

The method according to the invention affords a polishing removal of material in any desired thickness without impairing the obtained surface quality. During an endurance test, a 1.5 mm. thick layer, for example, was removed at an always constant high surface quality. A visible surface brilliance may be obtained after but a few polishing cycles. Micro- as well as macroroughness, such as turning grooves are levelled. The method responds only to roughness of the surface, and the surface quality is independent of the crystal core orientation at the surface being polished. Chemically strongly etched grains and grain boundaries become levelled. Moreover, the method is substantially independent of the electrode geometry and the electrode distance. The temperature influence on the reaction is slight and may be compensated by means of slight voltage changes, as has been mentioned.

To dissolve the oxide layer following the disconnection of the voltage, the niobium part to be polished need not necessarily remain in the electrolyte. The oxide layer may alternately be chemically dissolved, for example, by immersing the niobium part into another bath, such as hydrogen peroxide solution containing more than 2 weight percent $H_2O_2$. Following the dissolution of the oxide layer, the niobium part is placed back into the electrolyte and voltage is again applied. However, a dissolution of the oxide layer in the electrolyte itself is particularly simple and is therefore preferred.

The method is excellently suited for polishing the surfaces of cavity resonators made of niobium, but, of course, is also applicable for polishing any other desired niobium parts.

Upon a study of this disclosure, it will be apparent for those skilled in the art that our invention permits of a great variety of modifications and may be given specific embodiments other than those particularly set forth herein without departing from the essential features of our invention and within the scope of the claims annexed hereto.

We claim:

1. The method of electrolytically polishing parts made of niobium, which comprises immersing the niobium parts as an anode in an electrolyte substantially composed by weight of 86 to 93% $H_2SO_4$, 1.5 to 4.0% HF and 5.5 to 10.0% $H_2O$, maintaining the electrolyte during the polishing action at a substantially constant temperature between about 15° and 50° C. applying between the niobium part and an immersed cathode a substantially constant unidirectional voltage of about 9 to 15 volts whereby damped current oscillations are obtained during passage of the electrolytic current.

2. The method electrolytically polishing niobium items which comprises the steps of immersing the niobium part to be polished into an electrolyte essentially consisting by weight of 86 to 93% $H_2SO_4$, 1.5 to 4.0% HF and 5.5 to 10.0% $H_2O$, at a temperature of between about 15° and 50° C.; applying between the niobium part and the cathode a constant direct voltage between 9 and 15 volts whereby attenuated current oscillations are generated; disconnecting the voltage subsequent to the commencement of the decay of the current oscillations and for a period of time necessary for any oxide layer created during the period of voltage application to dissolve in the electrolyte; reapplying a direct voltage within the same 9 to 15 volt range and thereby again generating attenuated current oscillations; again disconnecting the voltage for the above-specified time period; and repetitively applying and terminating the voltage until a sufficient amount of electrolytic polishing has taken place.

3. The method according to claim 2, wherein the electrolyte consists essentially of 89.0 to 90.5 weight percent $H_2SO_4$, 2.2 to 3.0 weight percent HF and the remaining weight shares $H_2O$ at a temperature of 20 to 35° C. and the constant voltage applied is between 11 and 13 v.

4. The method according to claim 2, wherein the constant voltage is disconnected at the earliest when the maximum amplitude of the current oscillations has been exceeded.

5. The method as claimed in claim 2, wherein the constant voltage is disconnected when the amplitude of the current oscillations has decayed to less than about 5% of the maximum amplitude.

6. The method of claim 2, wherein the voltage remains disconnected for at least about 4 minutes.

7. The method of claim 1 wherein the electrolyte employed is kept in motion at least at the surface of the niobium part to be polished.

8. The method of claim 2, wherein the voltage remains disconnected for at least about 1.5 minutes and not more than 4 minutes.

9. The method of claim 2, wherein the electrolyte volume is large compared to the niobium item to be polished, whereby substantially no adjustment need be made in the constant voltage.

References Cited

UNITED STATES PATENTS

| | | | |
|---|---|---|---|
| 2,582,020 | 1/1952 | Emery | 204—140.5 |
| 2,871,174 | 1/1959 | Turner | 204—140.5 |
| 2,997,429 | 8/1961 | Rohrer et al. | 204—140.5 |

OTHER REFERENCES

Electrolytic Polishing of Metallic Surfaces, by Pierre Jacquet, Metal Finishing, June 1949, pp. 83–92.

HOWARD S. WILLIAM, Primary Examiner

T. TUFARIELLO, Assistant Examiner

U.S. Cl. X.R.

204—228